United States Patent
Maitra et al.

(10) Patent No.: US 9,530,314 B2
(45) Date of Patent: Dec. 27, 2016

(54) DYNAMIC ETA AND STA TRANSPORTATION SYSTEM

(71) Applicants: Anutosh Maitra, Bangalore (IN); Sanjoy Paul, Bangalore (IN); Saurabh Bhadkaria, Bangalore (IN); Chiranjeeb Ghosh, West Bengal (IN)

(72) Inventors: Anutosh Maitra, Bangalore (IN); Sanjoy Paul, Bangalore (IN); Saurabh Bhadkaria, Bangalore (IN); Chiranjeeb Ghosh, West Bengal (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

(21) Appl. No.: 14/032,861

(22) Filed: Sep. 20, 2013

(65) Prior Publication Data
US 2015/0046083 A1 Feb. 12, 2015

(30) Foreign Application Priority Data
Aug. 8, 2013 (IN) .......................... 3550/CHE/2013

(51) Int. Cl.
*G08G 1/123* (2006.01)
(52) U.S. Cl.
CPC .................... *G08G 1/123* (2013.01)
(58) Field of Classification Search
CPC .................................................. G08G 1/123
USPC ........................................................ 701/465
See application file for complete search history.

(56) References Cited

U.S. PATENT DOCUMENTS

| | | | |
|---|---|---|---|
| 6,836,725 B2 | 12/2004 | Millington et al. | |
| 2004/0083055 A1 | 4/2004 | Hirose et al. | |
| 2012/0010803 A1* | 1/2012 | Min et al. | 701/117 |
| 2014/0012494 A1* | 1/2014 | Cudak et al. | 701/412 |
| 2014/0088865 A1* | 3/2014 | Thies et al. | 701/465 |
| 2014/0288821 A1* | 9/2014 | Modica | G06Q 50/30 701/465 |

OTHER PUBLICATIONS

Daniel F. Urbanski, "Development of a GPS-Based Transit Tracking System for Corvallis", Oregon State University, Aug. 29, 2012, 45 pages.
"Patent Examination Report No. 1" on Australia Patent Application No. 2014208234, IP Australia, dated Aug. 29, 2014, 4 pages.
"Patent Examination Report No. 2", Australia Patent Application No. 2014208234, IP Australia, dated Nov. 12, 2014, 5 pages.

* cited by examiner

*Primary Examiner* — Fadey Jabr
*Assistant Examiner* — Yazan Soofi
(74) *Attorney, Agent, or Firm* — Mannava & Kang, P.C.

(57) ABSTRACT

A transportation system may store a standard time of arrival table including standard time of arrivals for fixed stops and waypoints or geo-sections. Delay of a vehicle reaching a fixed stop is determined and may be used to determine an estimated time of arrival to a destination on the route. Delay may be determined in response to traversing the waypoints or geo-sections on the route, and the estimated time of arrival may be updated according to the delay at each waypoint or geo-section.

20 Claims, 12 Drawing Sheets

DYNAMIC ETA AND STA TRANSPORTATION SYSTEM

BACKGROUND

Today's consumers are constantly on the go. They expect efficiency and ease-of-use in all services they consume, and transportation services are no exception. Public transportation services are used widely around the world. One of the biggest challenges for people using public transportation is knowing when their selected transport (e.g., bus, train or taxi) is going to arrive at the pick-up point. This is not just a problem for people using public transportation services but also with a variety of day-to-day transportation services, such as, school buses, company shuttles, etc.

Some existing systems predict the estimated time of arrival (ETA), however the performance of the existing systems in many cases is lacking. For example, the predicted ETAs are inaccurate and unreliable. Furthermore, calculating ETAs for taxis or other vehicles that do not have a pre-determined route is very challenging and accordingly estimating the ETAs with high precision for these vehicles can be challenging.

BRIEF DESCRIPTION OF THE DRAWINGS

Embodiments are described in detail in the following description with reference to examples shown in the following figures.

DETAILED DESCRIPTION

Figure 1:
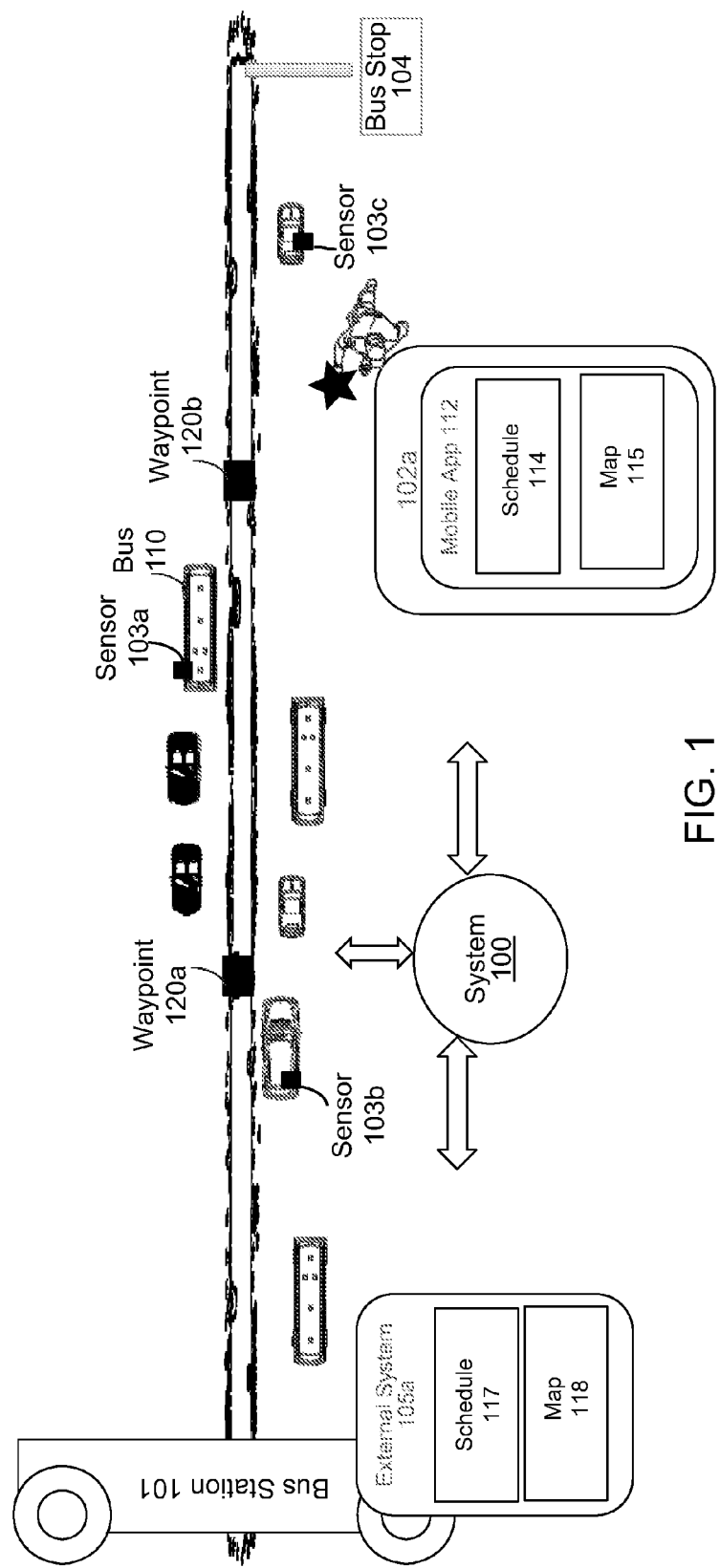
FIG. 1 shows an environment including a dynamic ETA and standard time of arrival (STA) estimation system, according to an embodiment.

For simplicity and illustrative purposes, the principles of the embodiments are described by referring mainly to examples thereof. In the following description, numerous specific details are set forth in order to provide a thorough understanding of the embodiments. It is apparent however, to one of ordinary skill in the art, that the embodiments may be practiced without limitation to these specific details. In some instances, well known methods and structures have not been described in detail so as not to unnecessarily obscure the description of the embodiments. Furthermore, different embodiments are described below, and may be used or performed together in different combinations.

According to an embodiment, a dynamic estimated time of arrival (ETA) and standard time of arrival (STA) estimation system can predict an ETA for a vehicle. Also, ETAs are updated in real-time to provide precise and timely ETAs. ETAs may be determined for vehicles that travel on a fixed route and that have fixed stops, such as a bus, train, or shuttle, and ETAs may be determined for vehicles that do not travel on a fixed route, such as taxis, private vehicles, etc.

The system can compute ETA for a vehicle at a destination based on a difference between a measured time a vehicle passes a waypoint while traveling to its destination and an expected time for the vehicle to pass the waypoint. For example, ETA determination is done by "looking forward" to a possible delay in an upstream location based on the delay already incurred in one or more downstream locations. Also, the system may use a most recent past event, such as a recent delay, to determine the future ETA at the destination, which can improve the accuracy of the ETA. Also, the ETA determination, for example, does not include a distance or speed measurement or computation, because it can compute the ETA based on actual arrival times at downstream designated points. Some conventional systems measure average speed and distance traveled to determine a destination ETA but there tends to be an inherent inaccuracy in distance computations when the traversed path is not a straight line. The present system avoids these inaccuracies by basing ETA on the delay already incurred in one or more downstream locations rather than distance computations and average speed.

The destination ETA calculation may be performed using a vehicle's existing global positioning system (GPS) to determine when a vehicle actually passes a waypoint. Accordingly, no other sensors, inside the vehicle or external to the vehicle, are needed to calculate the destination ETA. For example, sensors to measure vehicle speed or distance traveled are not needed to calculate the destination ETA.

The system can update STAs. Typically transportation authorities publish a timetable showing the STA at each stop on a given route that does not change for years as the cost of benchmarking STAs is very high. According to an embodiment, the system can automatically adjust the STAs over a period of time to be more accurate.

Waypoints or geo-sections may be used to calculate ETAs. A waypoint is a point on a fixed route or a non-fixed route. A geo-section is a portion of a geographic area. For example, a geographic area may be divided into geo-sections based on time of traversing a segment or based on a length of a segment. Routes between an origin and a destination may traverse multiple geo-sections. The system may use waypoints or geo-sections to determine ETAs. For example, an ETA to a destination may be determined each time a waypoint or geo-section on a route between the source and destination is traversed, which can account for any travel condition on the route that can impact the ETA. Thus, regardless of whether a travel condition occurs one time, such as an accident, or is semi-permanent, such as long-term construction, ETAs are determined based on present travel conditions and furthermore STAs may be updated based on longer-term travel patterns. Regarding STA adjustment, data is collected over a period of time to compare ETAs and STAs for every stop, and to compute the differences and use the differences over many samples to adjust the STAs.

FIG. 1 illustrates a transportation environment including a dynamic ETA and STA estimation system 100. The system 100 is able to gather vehicle location data from sensors 103, which may be a GPS in each vehicle but any sensor that can determine a location of a vehicle may be used. The sensors 103 for the vehicles include the sensors 103*a-c* shown in the vehicles in FIG. 1. The sensors 103 detect the locations of the vehicles, and messages may be transmitted from the vehicles that indicate their current locations measured by the sensors 103. A message transmitted from a vehicle indicating its location may also include a timestamp indicating the time the current location is determined. The system 100 may store the locations of the waypoints, such as the waypoints 120*a* or 120*b*, to determine the actual time of arrival (ATA) of the vehicle at a waypoint based on the received location and the timestamp. If the message does not include a timestamp indicating when the measurement of the vehicle's current location was made, then the time the message is transmitted may be used as the timestamp if that time is provided in the message. The messages may be transmitted to the system 100, for example, via a network, which may be a wired and/or wireless network. The system 100 calculates an ETA of a vehicle to its destination in response to determining the ATA of the vehicle at a waypoint and comparing it to a STA for the waypoint to determine a delay. The delay is used to determine an ETA at the destination. Further description of calculating an ETA and adapting an STA is provided below.

In one example, the vehicle is bus 110 with sensor 103*a*, and the bus 110 is traveling from the bus station 101 to the bus stop 104. In the example shown in FIG. 1, two waypoints 120*a* and 120*b* are between the bus station 101 and the bus stop 104. The sensor 103*a* for example detects when the bus 110 passes the waypoint 120*a* and a message is transmitted to the system 100. The message may include the bus information, bus detection time and waypoint location.

The system 100 receives the message and calculates a delay, and adds the delay to an STA for the bus stop 104 to determine the ETA of the bus 110 at the bus stop 104. The ETA for the bus 110 at the bus stop 104 is updated again after the bus 110 is detected at the waypoint 120*b* in a similar manner. The system 100 may transmit updates of the ETA at the destination for the bus 110 to various systems. For example, the system 100 may send updates to user devices that subscribe to updates. Mobile device 102*a* is shown and for example runs a mobile application (app) 112 to subscribe to transportation schedules and ETAs. The mobile device 102*a* includes a display. The mobile app 112 can display schedule 114 including STAs and ETAs for routes. STAs as well as ETAs may be updated by the system 100 and displayed on the mobile device 102*a*. The mobile app 112 may display a map 115 showing routes and current bus locations. In another example, an external system 105*a* at the bus station 101 may receive ETA and STA updates and display a schedule 117 include ETAs and STAs for routes and a map 118 similar to mobile device 102*a*. The mobile device 102*a* may show a limited number of routes and corresponding information that are pertinent to the user and/or the user's current location 119, and the external system 105*a* may show information for all the bus routes in the surrounding area.

FIG. 1 shows two waypoints between the bus station 101 and the bus stop 104. More or less than two waypoints may be used. The more waypoints that are provided between stops, the more accurate the ETA for the destination. Longer distances between stops or longer travel times between stops may include more waypoints. Also, waypoints may be provided along multiple routes, which may be fixed or not fixed. Also, instead of waypoints, geo-sections may be used to estimate ETAs for destinations, which is further described below.

Figure 2:
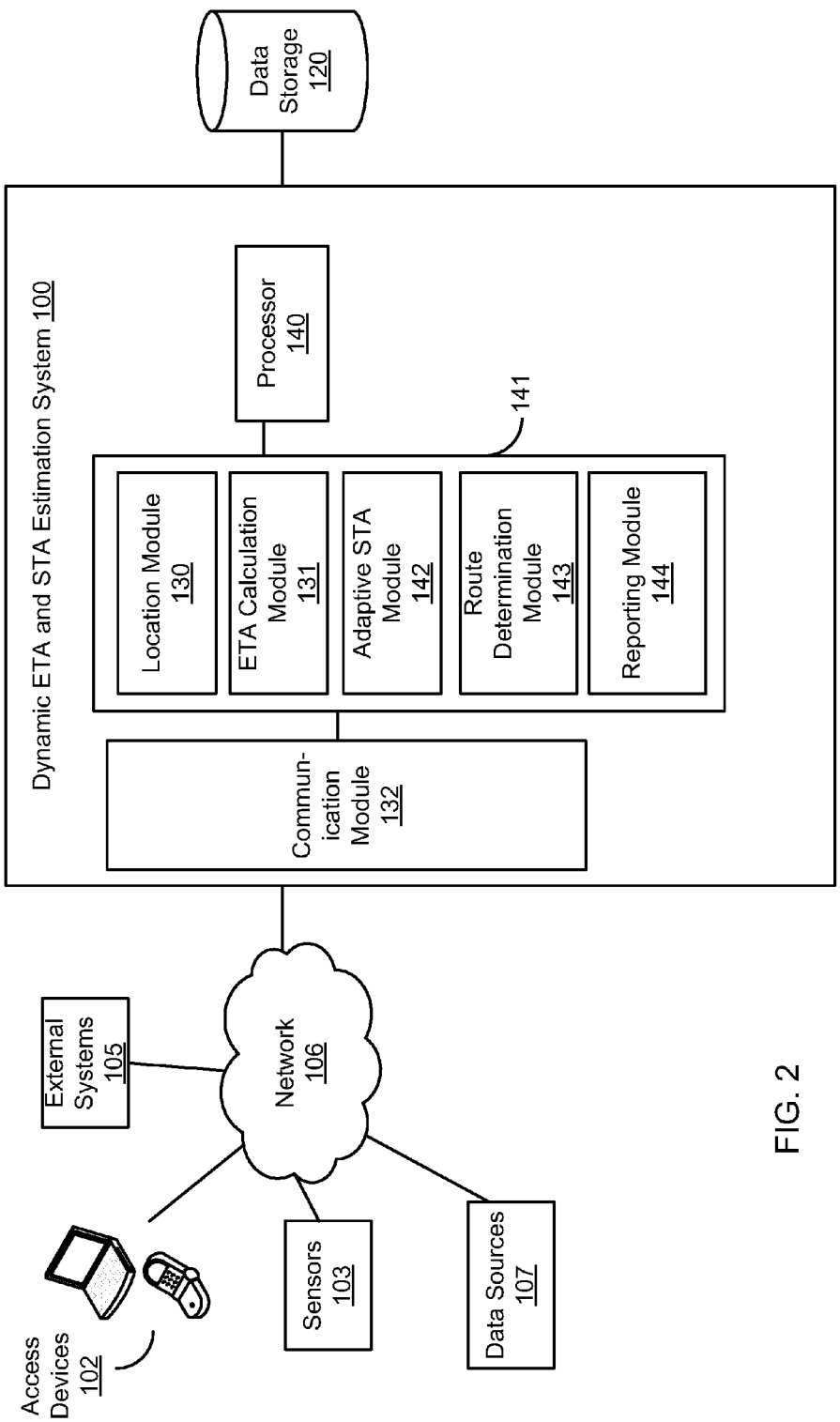
FIG. 2 shows a block diagram of the dynamic ETA and STA estimation system, according to an embodiment.

FIG. 2 illustrates a block diagram of the dynamic ETA and STA estimation system 100, according to an embodiment. The system 100 may be implemented as a back-end system that may communicate with the sensors 103, access devices 102, external systems 105 and data sources 107 via a network 106.

The network 106 may include wireless networks, mobile device networks (e.g., cellular networks), closed media networks, subscriber television networks, cable networks, satellite networks, the Internet, intranets, local area networks, public networks, private networks, optical fiber networks, broadband networks, narrowband networks, voice communications networks and any other networks capable of carrying data. Data may be transmitted using data transmission protocols including, by way of non-limiting example, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), Individual Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, signaling system seven ("SS7") technologies, Ethernet, in-band and out-of-band signaling technologies, and other suitable networks and protocol technologies.

The access devices 102 may be each associated with a user, which may be a subscriber to one or more services over the network 106. Data provided from an access device or another source to the system 100 may be tagged to identify the individual, the access device or the source. An access device may include any device configured to perform one or more of the access device processes described herein, including communicating with the system 100. An access device may include a wireless computing device, a wireless communication device (e.g., mobile device 102*a* shown in FIG. 1 which may be a smartphone), a portable computing device (e.g., a laptop), a portable communication device, a personal digital assistant, a network connection device, a content recording device (e.g., a camera, audio recorder, video camera), a vehicular computing and/or communication device, and any other device configured to perform one or more of the access device processes described herein.

The external systems 105 may include any systems external to the system 100 that may communicate with the system 100 and provide information to the system 100 or utilize information received from the system 100, such as the external system 105*a* shown in FIG. 1 for the bus station 101. The data sources 107 may include any system that provides information to the system 100. The data sources 107 may include a government agency or another entity that provides route information, location of waypoints, geo-section information, bus identifiers, STAs, schedules, etc.

The system 100 includes data storage 120 that stores any data used by the system 100. The data storage 120, for example, stores route information, location of waypoints, geo-section information, bus identifiers, STAs, schedules, ETAs, any information received from the sensors 103, access devices 102, external systems 105, data sources 107, etc. The data storage 120 may include a database system or other type of storage system. The data storage 120 may employ any type, form, and combination of storage media. For example, the data storage may include a hard drive, network drive, flash drive, magnetic disc, optical disc, random access memory ("RAM"), dynamic RAM ("DRAM"), other non-volatile and/or volatile storage unit, or a combination thereof. Data may be temporarily and/or permanently stored in the data storage 120. The system 100 may include a non-transitory computer readable medium 141, such as memory or other type of medium that may be operable to store machine readable instructions that are executable by a processor 140. The processor 140 may include one or more processors. The processor 140 may be a hardware processor including a central processing unit or other type of processing circuit.

Components of the system 100 may include software, hardware (e.g., processor 140 and non-transitory computer readable medium 14) or a combination of hardware and software. The components may include machine readable instructions stored on the non-transitory computer readable medium 141. The components of the system 100 may include location module 130, ETA calculation module 131, communication module 132, adaptive STA module 142, route determination module 143, and reporting module 144.

The location module 130 determines the current location of vehicles for example based on information from the sensors 103 and detection times for the vehicles at their current locations. The ETA calculation module 131 determines ETA for a destination based on a current vehicle location and a detection time. The adaptive STA module 142 automatically updates STAs based on detected patterns. The route determination module 143 may determine a current route towards a destination for a vehicle to estimate ETA. The route determination module 143 can determine the current fixed route or non-fixed route towards the destination. The reporting module 144 can generate messages including ETAs and STAs to transmit to access devices 102 and external system 105. ETAs and STAs may be determined locally and displayed on the access device.

The communication module 132 may transmit and receive messages over the network 106, including receiving data representative of content and associated data (e.g., location data) from and providing data representative of content to access devices 102 by way of the network 106. The communication module 132 may include and/or support any suitable communication platforms and technology for communicating with and transporting content and associated data to/from access devices 102 over a network in unicast and multi-cast formation. The communication module 132 may be configured to support a variety of communication platforms, protocols, and formats such that the system 100 can receive content from and distribute content to a variety of platforms (e.g., a mobile telephone service platform, a web-based platform, etc.) and using a variety of communications technologies in unicast and multi-cast and broadcast formation. The communication module 132 may include a wired or wireless network interface including hardware.

The system 100 may include additional components not shown and some of the components described may be removed and/or modified. The system 100 may include a server hosting software. For example, a server may host software embodying the system 100 or multiple distributed servers may perform the functions of the system 100 in a distributed computing environment.

Figure 3:
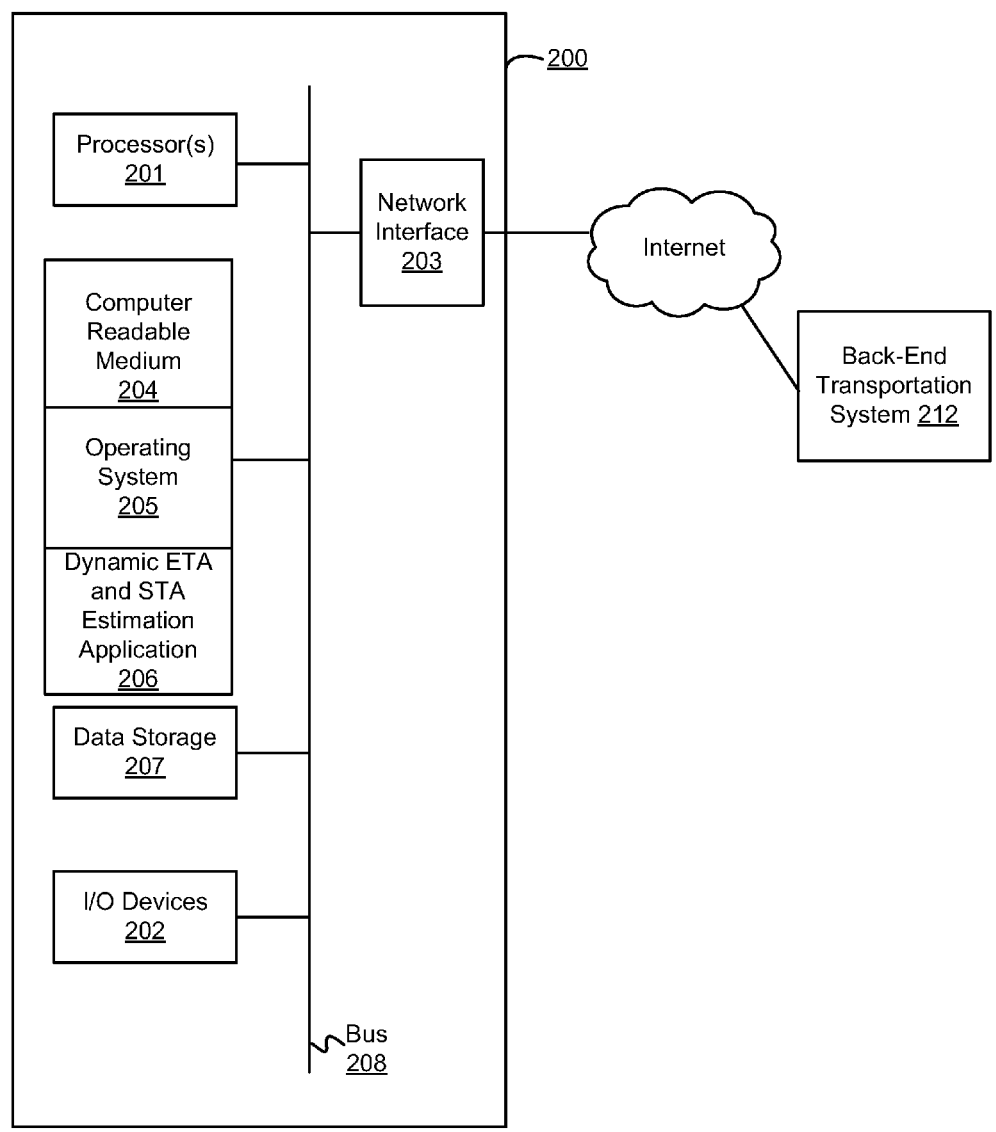
FIG. 3 shows an embodiment of the dynamic ETA and STA estimation system implemented as a locally-based system.

In another embodiment, the system 100 may be provided in any of the access devices 102. For example, calculation of ETAs may be performed by a software application running on the access device. The application may be a mobile app running on a smartphone. FIG. 3 shows a block diagram of an access device 200 which may be one of the access devices 102 shown in FIG. 2. The access device 200 stores and runs a dynamic ETA and STA estimation application 206, which may include modules of the system 100 shown in FIG. 2. The application 206 may also perform one or more of the functions of the mobile app 112 shown in FIG. 1 and described above.

The access device 200 includes processor(s) 201, such as a central processing unit, ASIC or other type of processing circuit; input/output devices 202, such as a display, keyboard, etc., a network interface 203, such as a Local Area Network (LAN), a wireless 802.11x LAN, a 3G or 4G mobile WAN or a WiMax WAN, and a computer-readable medium 204. Each of these components may be operatively coupled to a bus 208. Computer readable medium 204 may be non-transitory and comprise any suitable medium which stores machine readable instructions to be executed by processor(s) 201. For example, the computer readable medium 204 may be non-transitory and/or non-volatile, such as a magnetic disk or volatile media such as RAM. The instructions stored on the computer readable medium 204 may include machine readable instructions executed by the processor(s) 201 to perform the methods and functions of the system 100. The computer readable medium 204 may include solid state memory for storing machine readable instructions and/or for storing data temporarily, which may include information from the data repository, for performing project performance analysis.

The computer readable medium 204 may store an operating system 205, such as MAC OS, MS WINDOWS, UNIX, or LINUX, and application 206, which include a software application providing the system 100. The operating system 205 may be multi-user, multiprocessing, multitasking, multithreading, real-time and the like. The application 206 runs on the operating system 205. Multiple applications may run on the operating system 205.

The access device 200 includes a data storage 207 which may be non-volatile and can store data for the application 206. The network interface 203 connects the access device 200 to other devices and systems via a network, such as the Internet. The access device 200 may connect to the back-end transportation system 212 to receive sensor data from the sensors 103 if the data cannot be received directly from the sensors 103. In one example, a location sensor (e.g., GPS or other location sensor in the access device 200 that determines geographic location) in the access device 200 may be used to determine vehicle location. For example, if the access device is a smartphone, and the user is travelling on the bus 110 shown in FIG. 1, the access device 200 may determine when the vehicle passes a waypoint, assuming the waypoint location is programmed into the smartphone, to update the ETA at the destination. Other data may be stored in the back-end transportation system, such as route data, information for waypoints, STAs, etc., and this information may be downloaded to the access device 102 upon request or pushed. This data may be used to calculate ETAs for destinations as is further described below.

Figure 4:
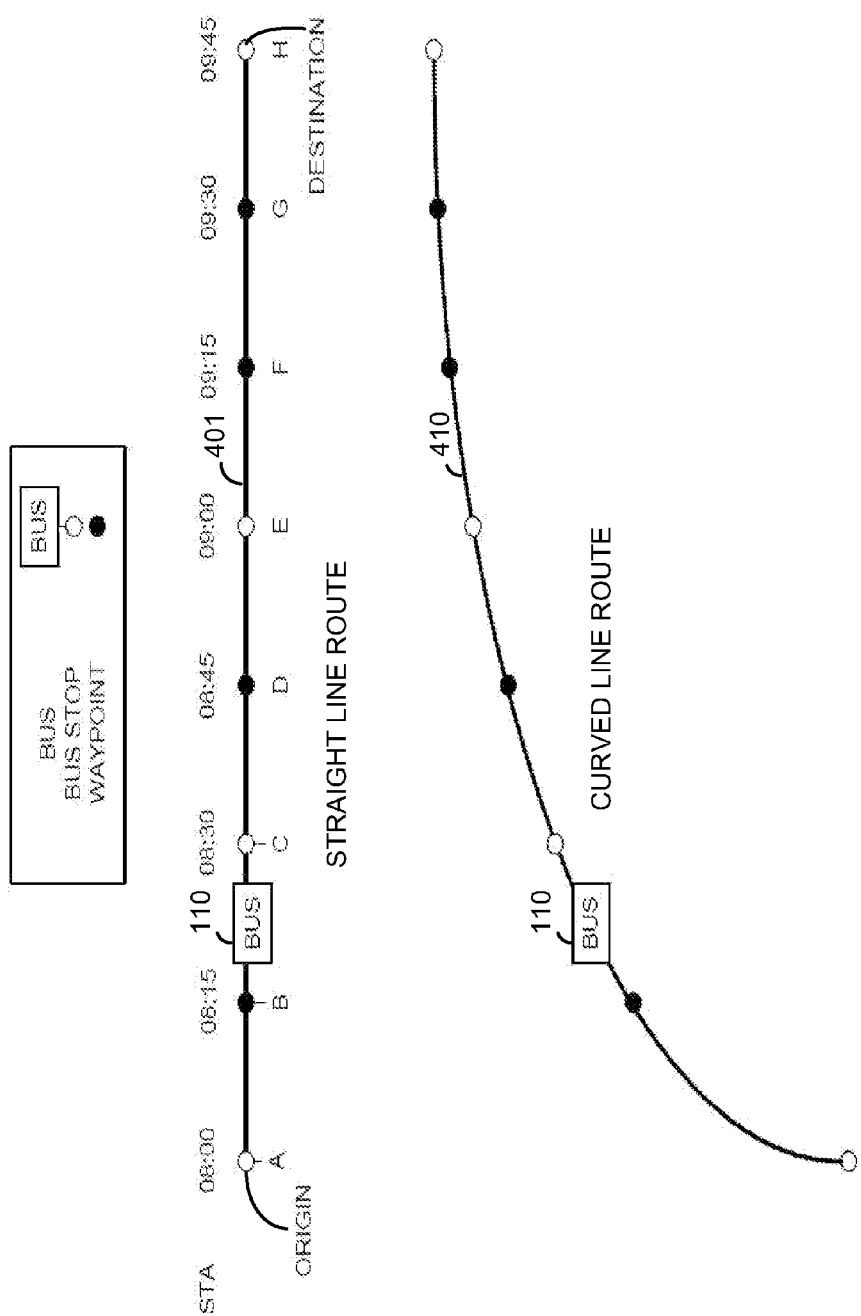
FIG. 4 shows examples of routes with waypoints.

FIG. 4 shows examples of routes 401 and 410 for which ETAs may be calculated by the system 100 for a destination on the routes based on actual time of arrival (ATA) at each waypoint. For example, in FIG. 4, the bus 110 travels on the fixed route 401 having fixed stops which are the bus stops in this example. Waypoints B, D, F and G on the route 401 are shown as block dots and the bus stops C and E and the origin A (i.e., source or start of route) and destination H are shown as open circles. Also, shown are STAs for each stop and the destination assuming the bus leaves the origin A at 8:00.

The information for the bus stops C and E and origin A and destination H, like geo-location coordinates (latitude and longitude), STAs, and a bus identifier, are stored in the data storage 120 of the system 100 shown in FIG. 2. The identifiers of the waypoints B, D, F and G along the bus route 401 and their geo-coordinates and STAs are also stored. Waypoints may be located at junctions on the route 401 where there could be a possibility of an alternate path for the same source destination pair or at other locations. The STAs for these waypoints may be computed offline for example by interpolating the published time table in between two bus stops and stored. The system 100 determines when the bus 110 crosses one of the waypoints B, D, F or G on the way to the destination H for example based on information from the sensor 103*a* for the bus 110 shown in FIG. 1. Once the bus 110 is determined to cross a waypoint or a bus stop, a database flag is updated and delay is calculated as the difference between the current time (e.g., the time the bus 110 is detected at the waypoint) and the STA at that waypoint or bus stop. When the user selects a particular bus stop for example via the mobile app 112 shown in FIG. 1, the selected bus stop is sent to the system 100 where the delay is computed and used to calculate the ETA: ETA=STA+Delay. The delay is computed at each waypoint by finding the difference between the ATA and the STA. This delay is used to compute the ETA at all subsequent bus stops. For example, the delay of the bus 110 after it crosses waypoint B is ATA of waypoint B minus STA of waypoint B, and the ETA at the bus stop C is the STA of the bus stop C plus the delay. If the delay has a negative value, the ETA is set to the STA. Delays and ETAs may be calculated by the ETA calculation module 131 shown in FIG. 2.

FIG. 4 shows that a route (e.g., route 410) may be a curved route or a route encompassing turns, etc. The ETA for a curved route is computed the same way as described above with respect to a straight route.

The STAs may be revised automatically by the system 100. For example, if the delay is computed to be high (larger than a set threshold) for a waypoint, that particular waypoint is marked for further analysis. If the delay is found to be consistently large over a period of time, the STA on that route is recomputed. Over a period of time, such waypoints and bus stops marked regularly are selected and more waypoints are inserted for further enhancing the ETA calculation. This is done automatically by the system 100.

For example, the adaptive STA module 142 is able to revise STAs based on detected patterns, such as consistent delays at a particular waypoint or bus stop. STAs may be reduced if consistent early arrivals are detected. This could be due to various reasons like increase in traffic density, decrease in traffic due to new alternative routes, etc.

One example of a function for revising STAs is as follows. Assume, the bus 110 is at the point X shown in FIG. 4. Let $ATA_C$ be the actual time of arrival of the bus 110 at bus stop C. Let $STA_C$ be the standard time of arrival of the bus 110 at bus stop C. Let $DS_C$ be the +/− delay for bus stop C for one or more bus routes, where $DS_C=STA_C-ATA_C$. For over a period of M number of days (where M may be user-defined; e.g., default=20), if $|DS_C|$>Thresh (where Thresh may be user-defined; e.g., default=10 min) for N consecutive days, then set $STA_C=STA_C+DS_C$.

Another example of a function for revising STAs is similar to the function described above but Thresh and N are automatically computed to determine if the STA should be changed or not. In an example, the assumptions are the same as described above. Assume, the bus 110 is at the point shown in FIG. 4. Let ATA be the actual time of arrival of the bus 100 at bus stop C. Let $STA_C$ be the standard time of arrival of the bus at bus stop C. Let $DS_C$ be the +/− delay for bus stop C for one or more bus routes, where $DS_C=STA_C-ATA_C$. Repeat the process described above every day or for some rolling window. σ=Standard Deviation of $DS_C$. Set Thresh=n*σ (where n may be user-defined; e.g., default is n=2). The system 100 identifies the bus stops for which $DS_C$>Thresh and computes the number of consecutive days (N) for which $DS_C$>Thresh for each of these bus stops. Then, N may be set to $N_M$=Mean (N).

Figure 5A:
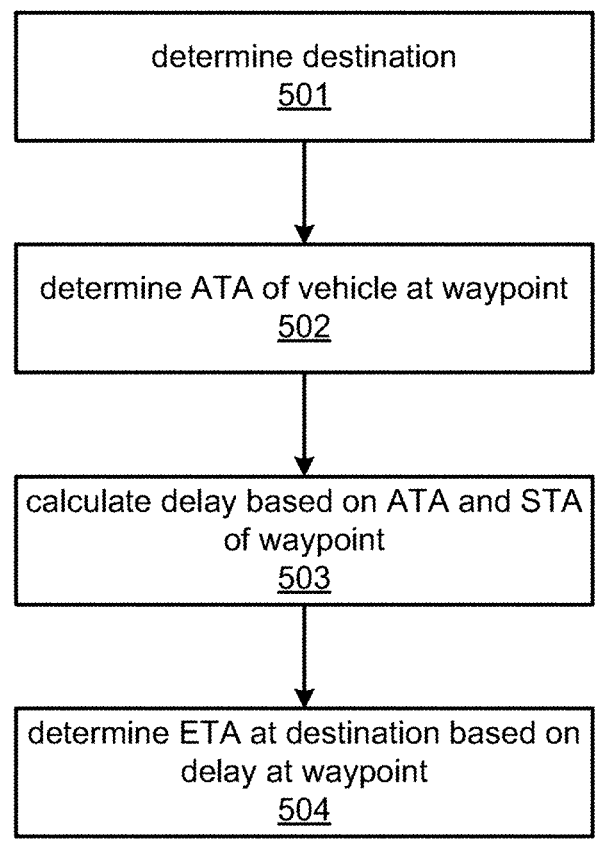
FIGS. 5A-B show methods for determining ETAs and STAs, according to embodiments.
Figure 5B:
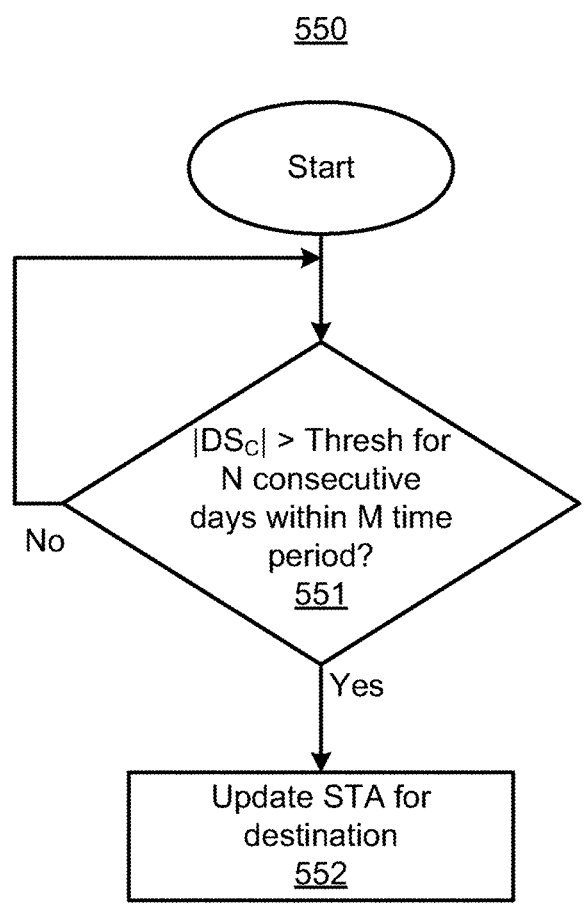

FIG. 5A illustrates a method 500 for determining an ETA based on waypoints and FIG. 5B illustrates a method 550 for updating an STA. The methods and functions and operations are described by way of example as performed by the system 100 shown in FIG. 2 but may be performed by other systems.

As shown in FIG. 5A for the method 500, at 501, the system 100 determines a destination, which may be input by a user. At 502, the system 100 determines ATA of the vehicle at a waypoint on a route to the destination, for example, based on information from one or more of the sensors 103 shown in FIG. 1. At 503, the system 100 calculates delay based on the ATA and STA at the waypoint. At 504, the ETA of the destination is determined by adding the delay to the STA of the destination. For subsequent waypoints that are traversed enroute to the destination, steps 503 and 504 are repeated to revise the ETA of the destination. For example, the delay is determined for a subsequent waypoint. The delay is added to the original STA for the destination to determine the ETA.

FIG. 5B shows the method 550. At 551, the system 100 determines whether for over a period of M number of days, if the delay of a destination or waypoint is greater than a threshold for N consecutive days, e.g., $|DS_C|$>Thresh for N consecutive days. If yes, at 552, then the STA is updated for that destination or waypoint based on the delay, e.g., set $STA_C=STA_C+DS_C$ as described above. In one example, the average delay, if over the threshold, is added to the STA of the destination to determine the new STA for the destination. The new STA may be stored and may be updated again. The threshold and N may be automatically computed as described above. If no, the STA for the destination is not changed and the method 550 may be repeated.

According to an embodiment, instead of using waypoints, a geographic area in which the vehicles are tracked is divided into geo-sections. In one example, the geographic area may be divided into a grid, and each geo-section in the grid is of x by x length, such as 1 kilometer by 1 kilometer. An STA is determined for each geo-section for example based on historic arrival times in the geo-sections. For example, ATAs in the geo-sections over a historic time period are determined and the STA for each geo-section may be the average ATA for the geo-section for a particular route. The STAs for the geo-section are stored in a STA table in the data storage 120 and used to calculate ETAs for destinations. For example, the system 100 determines when a vehicle enters a particular geo-section, for example, based on information for one or more of the sensors 103 shown in FIG. 1 tracking location of the vehicle, and calculates the delay by computing the difference of the ATA of the vehicle entering the geo-section and the pre-calculated STA for the geo-section from the STA table.

Figure 6:
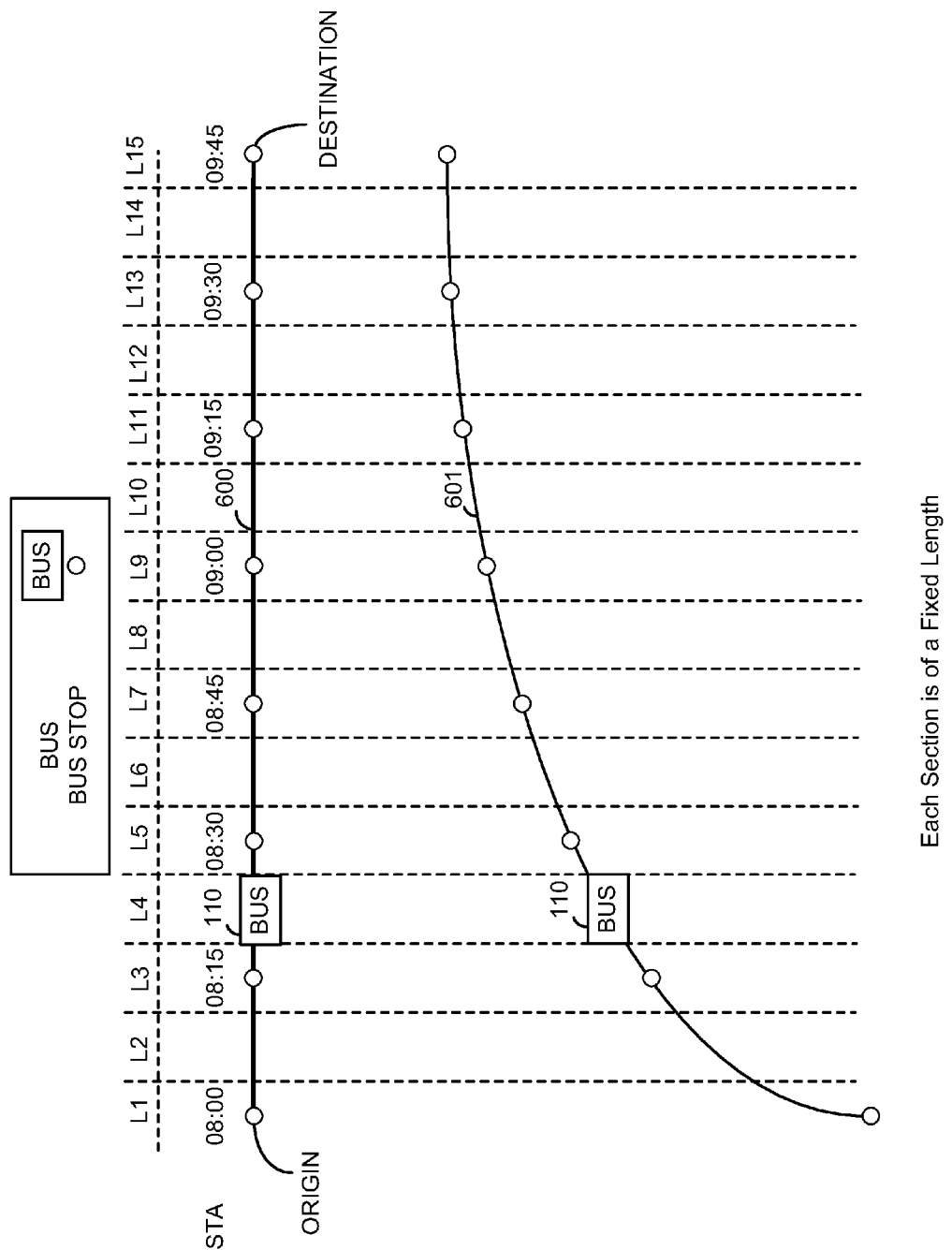
FIG. 6 shows an example of utilizing distance-based geo-sections for determining ETAs.

FIG. 6 shows an example of a geographic area divided into geo-sections L1-L15 based on distance. In this embodiment, the geo-sections are divided according to distance. For example, each geo-section along the straight-line route 600 is a fixed length, such as 1 kilometer long or another distance may be used. The geo-sections are shown only divided by vertical lines in FIG. 6, but the geo-sections may also be further divided by horizontal lines to create a grid and each geo-section may have x by y dimensions whereby x and y are greater than 0.

In the example in FIG. 6, the bus 110 is currently in geo-section L4. An STA is stored for L4 and may be based on a historical average. The delay is the ATA at L4 minus the STA of L4. The ETA for bus stop C is the delay plus the STA for bus stop C. For example, a 2-minute delay calculated for L4 causes the ETA for bus stop C to be 8:32. FIG. 6 also shows a curved line route 601. The same delay and ETA calculations are performed for the curved line route 601. This embodiment reduces the computational load on the system 100 without sacrificing the accuracy of estimating an ETA for a destination.

In another embodiment, utilizing geo-sections, the geo-sections are divided based on time instead of distance. For example, the geo-sections are determined based on distance traveled by a vehicle for a fixed time, such as 1 minute. By averaging the historical distances travelled for the predetermined time interval, each time-based geo-section is assigned automatically with a particular STA. Thus, unlike FIG. 6, where the size of each geo-section may be the same, in FIG. 7, the size of different geo-sections may be different because the distance that can be travelled in the predetermined time interval varies based on location. For example, certain sections of a route may have denser traffic and thus have smaller geo-sections because the distance travelled in for example a 1-minute interval is shorter than another section of the route where there is less traffic and possibly fewer traffic lights. The differently-sized geo-sections are shown in FIG. 7.

Figure 7:
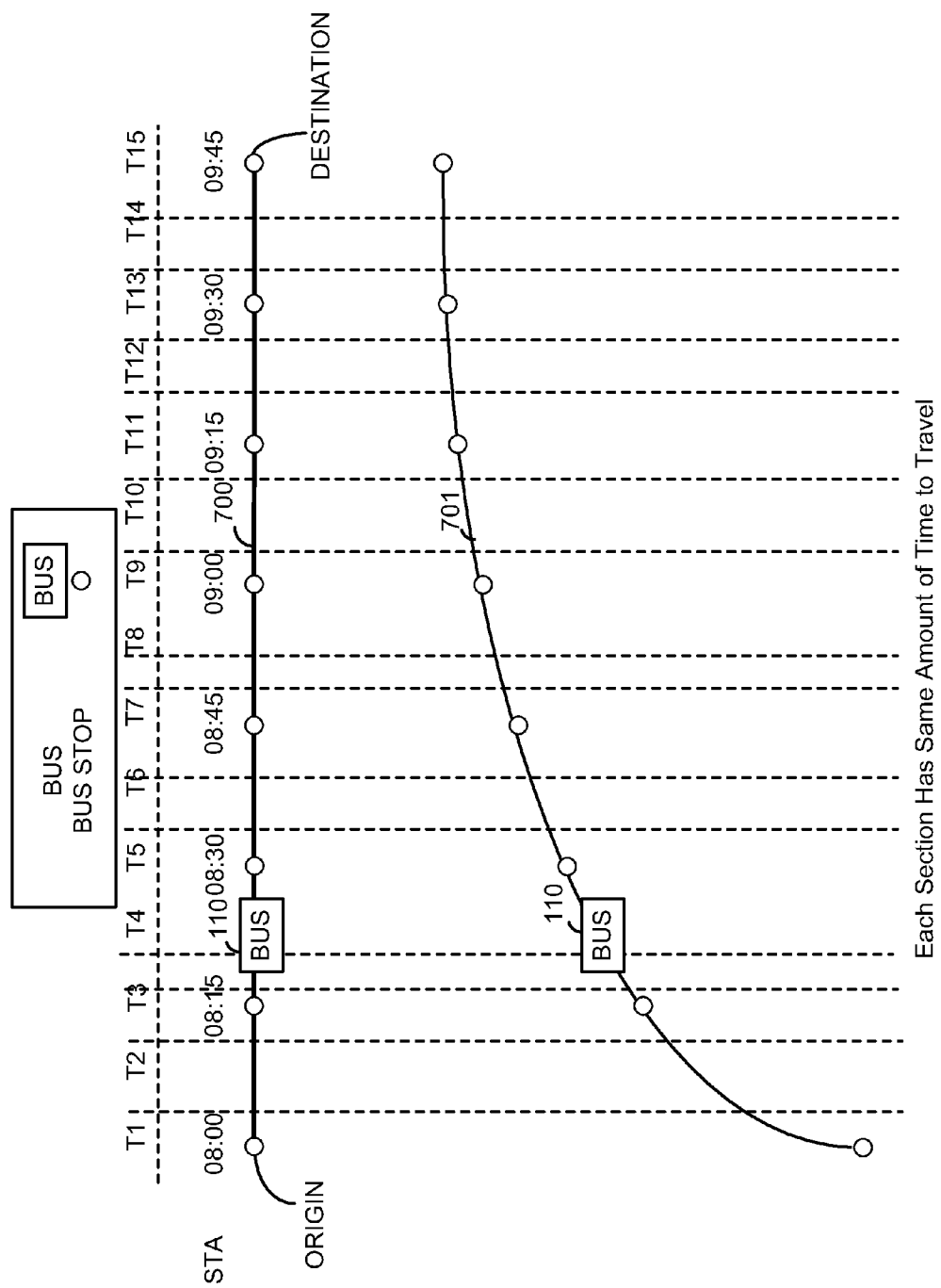
FIG. 7 shows an example of utilizing time-based geo-sections for determining ETAs.

The ETA in FIG. 7 is calculated similarly as described with respect to FIG. 6. For example, the system 100 detects the bus 110 at geo-section T4 and subtracts the ETA at T4 with the STA of T4 to determine delay. The delay is added to the STA of the destination bus stop C to determine the ETA for the bus stop C. Straight-line route 700 and curved route 701 are shown to illustrate that differently-sized and shaped routes may be taken but the ETA calculation method is the same. This embodiment improves accuracy of ETA estimation and may reduce the computational demand of the system 100 because the practical case is often that vehicles do not travel at uniform speed on different sections of a route, and this embodiment takes this into consideration.

The methods 500 and 550 shown FIGS. 5A-B for calculating ETAs and updating STAs is substantially the same for the geo-section embodiments shown in FIGS. 6 and 7 except STAs are stored for each geo-section instead of each waypoint in an STA table in the data storage 120, and delay is determined from ATAs determined for geo-sections rather than waypoints.

As described above with respect to FIG. 3, a dynamic ETA and STA estimation application 206 may be executed on the access device 200 to calculate ETAs locally instead of at a remote system, such as shown in FIGS. 1 and 2. This can improve response time for determining ETAs.

Figure 8:
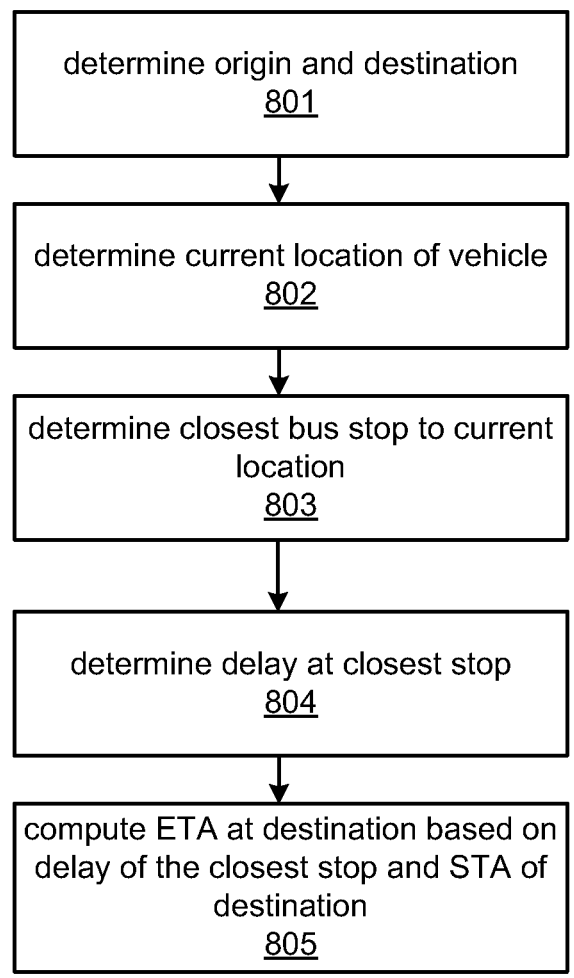
FIG. 8 shows a method for determining ETAs utilizing the locally-based dynamic ETA and STA estimation system, according to an embodiment.

FIG. 8 shows a method 800 for determining an ETA for example by the application 206, according to an embodiment. At 801, an origin and destination are determined. The user may input this information into the access device 200.

At 802, the current location of a vehicle of interest is determined. For example, if the user needs to take a bus, the current location of the bus is determined. The bus location may be determined by GPS and transmitted to a backend system (e.g., backend transportation system 212 shown in FIG. 2) or other vehicle tracking systems may be used to determine current location. The access device 102 may receive the location of the bus from the backend system. In one example, the user may input information, such as the bus stop where the user will catch the bus and/or the user's current location is determined by the access device 102. This information may be sent to the back-end transportation system 212 shown in FIG. 2 along with the other user input described at 801. The back-end transportation system 212 may include a database storing bus routes with fixed stops, location of the stops, and may determine the current location of the busses in transit. The back-end transportation system 212 may identify a bus and a route for the user that will take the user to the destination and send the location of the bus to the access device 200 of the user and the route information.

At 803, the closest bus stop of the current location of the bus is determined. An application program interface (API) may be used to query distances and/or directions to determine the closest bus stop on the route to the current location of the bus. The APIs are described below. The closest stop for example is the next closest stop as the bus travels on the route toward the destination.

At 804, the delay at the closest stop is determined for example by estimating the ATA at the closest stop and subtracting the estimated ATA from the STA at the closest stop.

At 805, the ETA of the destination is computed based on the delay and the STA of the destination. For example, the delay is added to the STA to determine the ETA. The STA of the destination may be downloaded from the backend system to calculate the ETA. The STA of the destination may be a predetermined STA.

In one example, distances from the current location of the bus to closest stops are determined through a distance API. For example, GOOGLE's distance matrix API may be used to determine distance between two points on a map. This API is a web service that provides duration and time for a recommended route between an origin and a destination. The distance API can return the distances between the current location and the bus stops on the route to determine the closest stop to the current location. In another example, GOOGLE's direction API may be used to determine the closest bus stop to the current location of the bus. The direction API calculates directions between locations using an HTTP request. Directions may specify origins, destinations and waypoints, and the API returns multi-part directions using a series of waypoints. Using one or more of the APIs, the next closest stop of the bus may be determined.

Figure 9:
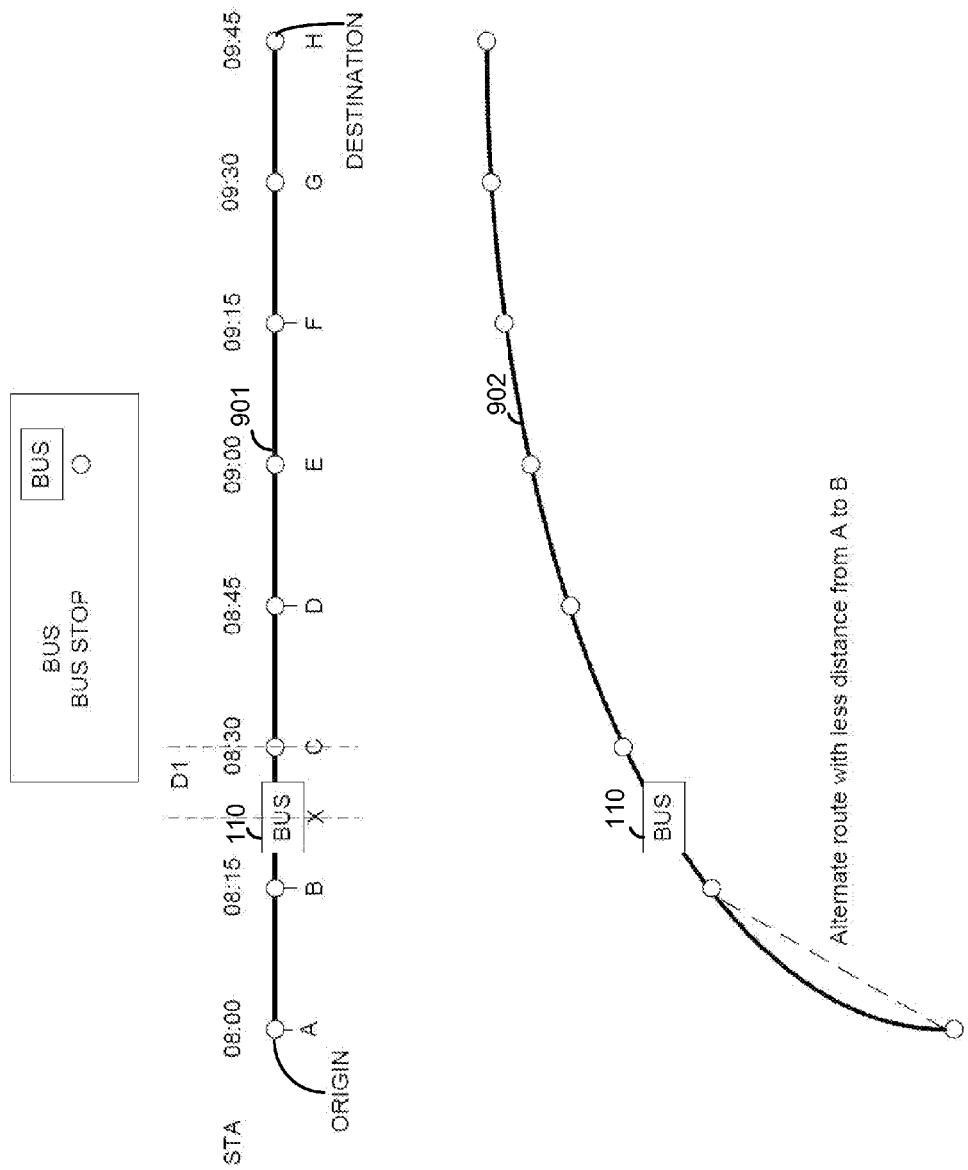
FIG. 9 shows an example of utilizing a locally-based dynamic ETA and STA estimation system.

Referring to the example shown in FIG. 9, route 901 is shown. Assume the user is trying to catch the bus 110 at stop D to go to the destination H. The user want to know the ETA of the bus 110 at the stop D and the final destination H.

The information for the route 901, including STAs and stop locations, and the current location of the bus 110 may be downloaded from the system 212. Location pairs may be sent to the distance API to determine distance and duration between the pairs. For example, the current location of the bus 110 and the locations of stops on the route are sent to the API to determine the closest stop to the bus 110. The next closest stop may be identified, such as stop C.

For example, the distance D1 between the current location of the bus 110 and the selected bus stop (e.g., stop D) is determined. The average speed of the bus 110 between each bus stop is predetermined and may be downloaded from the system 212. The ETA to the next closest stop (e.g., stop C) is calculated as follows: ETA to the nearest bus stop=current time when bus's current location is determined+D1/Average Speed. Then, the delay for the nearest bus stop is determined from the ETA and the STA. For example, for stop C, delay=ETA−STA. Based on the delay at the nearest bus stop, the ETA is determined for any subsequent stop including stop D and stop H by adding the delay to the STA for the desired stop. This method may be periodically repeated to update the ETAs as the bus 110 travels on the route 901. The method may also be applied to curved routes such as the route 902.

Figure 10:
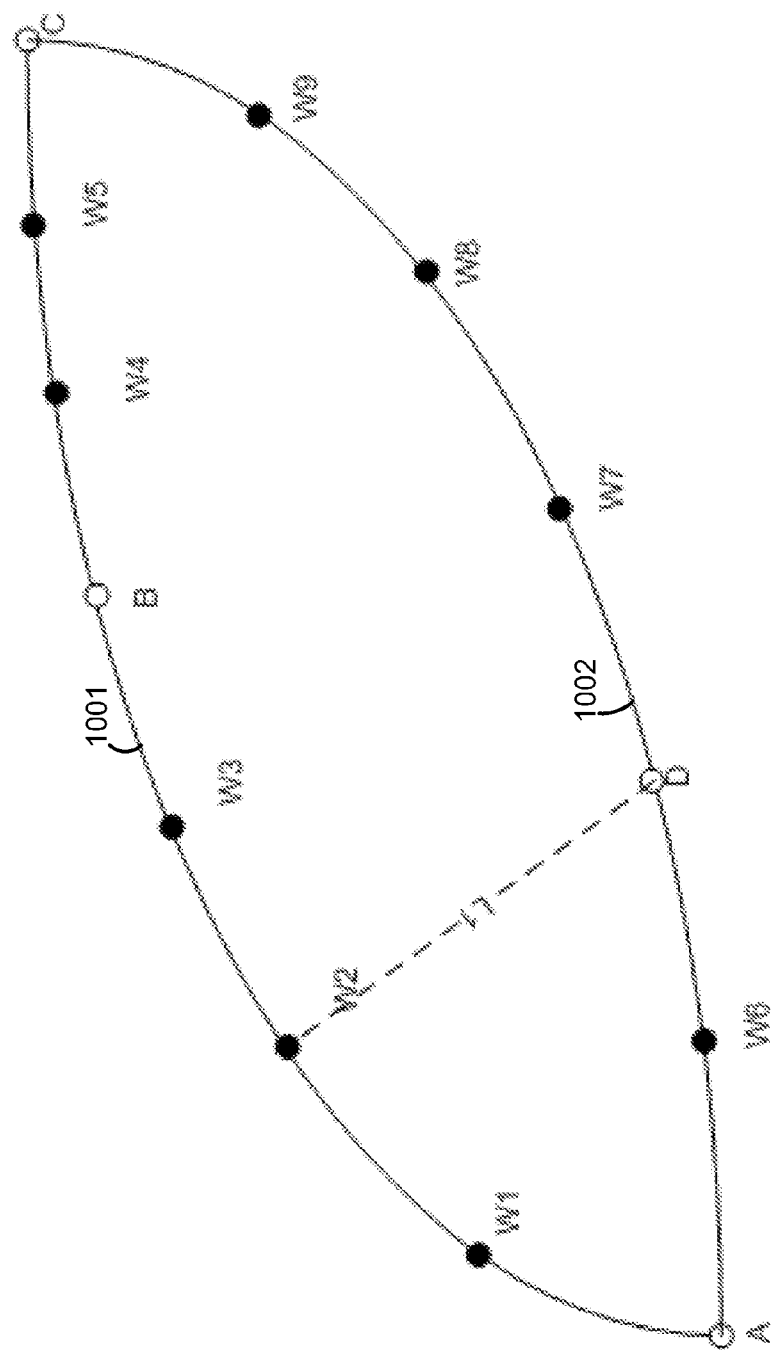
FIG. 10 shows examples of non-fixed routes.

FIG. 10 shows an example of multiple routes that may be taken by a vehicle. For example, taxis often take different routes between an origin and a destination but the ETA estimation for a non-fixed route may be applied to any vehicle. In this situation, there are typically no fixed stops and no fixed path. According to an embodiment, waypoints are selected and an STA is determined for each waypoint. Waypoints can be selected such that a sufficient number of waypoints are provided on each possible path in a source-destination pair.

Locations of the waypoints are predetermined and stored and STAs for the waypoints may be determined over time. For example, field data is stored over weeks to determine travel times between virtual waypoints and average travel time may be stored as STAs.

In FIG. 10, there are two possible paths 1001 and 1002 to reach C from A. The STAs of the waypoints W1 to W9 along the paths A-B-C (i.e., path 1001) and the path A-D-C (i.e., path 1002) are stored for example in the system 100. The system 100, for example, the route determination module 143 of the system 100, determines the current path the vehicle is on between the A and C. This is done by stitching together segments on the paths from the origin all the way to the destination. A segment is a path segment between two waypoints. Segments may be contiguous along a path to the destination. For example, the segments A-W1, W1-W2, W2-W3, W3-B, B-W4, W4-W5, W5-C are contiguous along the path 1001. Segments may be non-contiguous and traverse multiple paths to a destination, such as W6-D and D-W2. When segments are contiguous, the ETA calculation is the same as in the case of a bus on a route, such as described with respect to FIG. 5A. When the vehicle changes direction from a contiguous stretch of segments, such as from A to D and then changing over to W2, the system 100 detects the change, and the ETA calculation changes to include waypoints on the path 1001 to the destination C from W2. The ETA is predicted only after the vehicle reaches a pre-specified waypoint, such as W2. Once W2 is reached, the system 100 assumes a route to the destination C from W2 via B and ETA calculations based on this new route are determined such as described above. If the vehicle changes its route again, the above procedure is repeated.

The system 100 periodically performs checks to detect a change in the route. For example, once a vehicle is travelling on its way to a destination, all the routes to the destination and the waypoints on the routes are examined to detect the closest waypoint. ETA is then based on the path on which this waypoint falls. If the next waypoint is not reached within a specified tolerance of the ETA on that waypoint, a trigger is generated indicating the possibility of route being changed. In such a case, the ETA to the destination is altered only after finding the next nearest waypoint.

Figure 11:
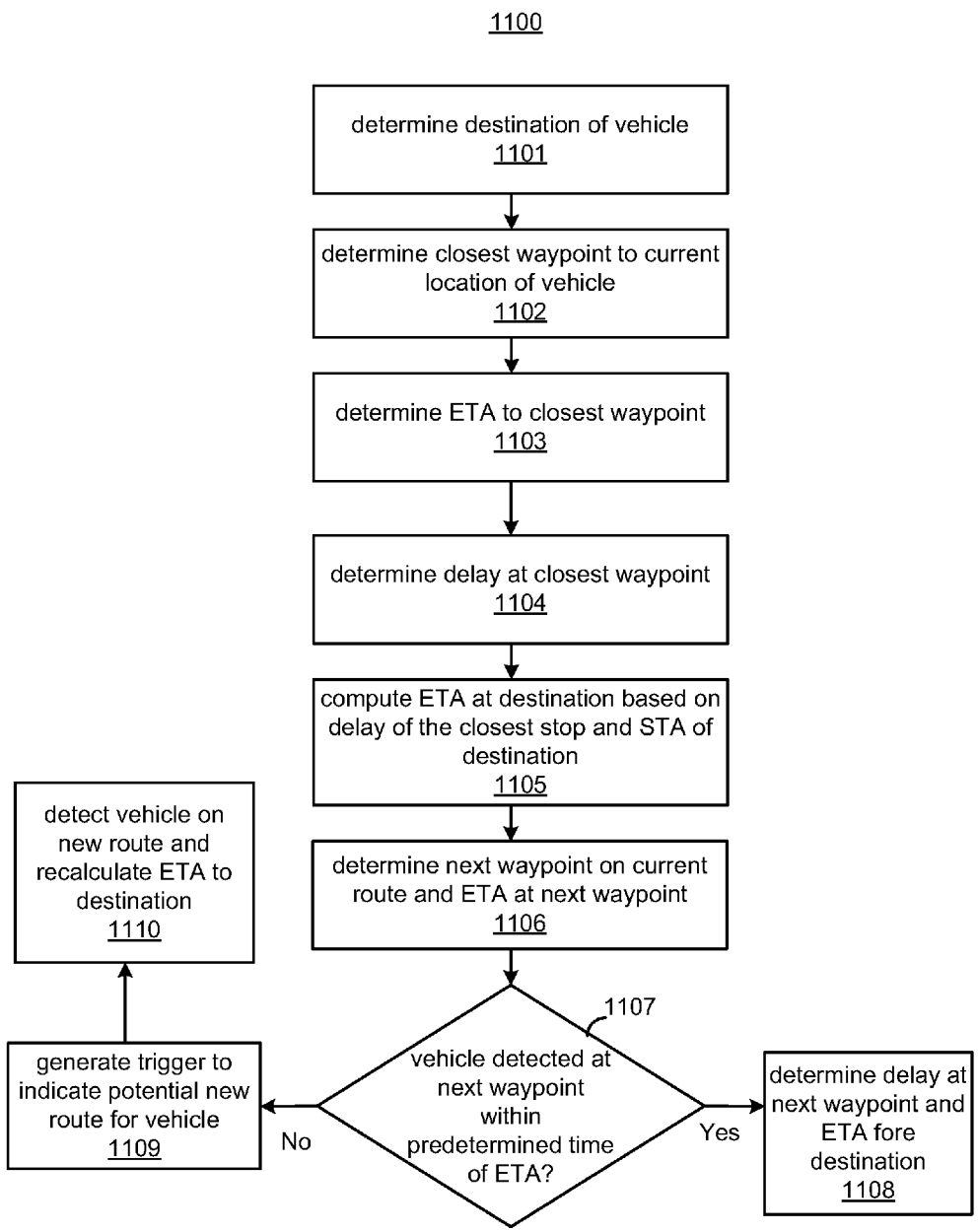
FIG. 11 shows a method for determining ETAs for a non-fixed route, according to an embodiment.

FIG. 11 shows a method 1100 for determining an ETA to a destination for non-fixed routes. At 1101, the system 100 determines a destination of a vehicle. The destination may be entered on a user's access device and it is transmitted to the system 100. In one example, a taxi may enter a destination for a customer and it is transmitted to the system 100.

At 1102, all the routes to the destination including the waypoints on the routes are examined to detect the closest waypoint to the current location of the vehicle. For example, the current location of the vehicle is determined for example from a GPS of the vehicle. The closest waypoint is then determined based on the routes. The method described with respect to FIGS. 9 and 10 describes determining a closest stop to a current location of the vehicle. This same method may be applied to determine the closest waypoint to the vehicle, which may be W1 or W6, assuming the vehicle's current location is at the origin A. The method may be applied to each route for which the vehicle may be travelling on to determine the closest waypoint. For example, distances are determined from the current location to W1 and W6 to determine the closest waypoint.

At 1103, ETA to the closest waypoint is determined. For example, as described with respect to FIGS. 9 and 10, the ETA may be determined. ETA to the closest waypoint=current time when vehicle's current location is determined+D1/Average Speed, where D1 is distance from the current location to the closest waypoint.

At 1104, the delay for the closest waypoint is determined, such as delay=ETA−STA for the closest waypoint. At 1105, the ETA for the destination C is determined based on the delay, such as by adding the delay to the STA for the destination C for the route 1002.

At 1106, the system 100 determines a next waypoint on the route 1002 and an ETA to the next waypoint. For example, the system 100 identifies the current route of a plurality of stored routes which the vehicle is travelling on to reach the destination and determined the next waypoint. For example, from W6 to C, W7 is the next waypoint. The system 100 determines an ETA to W7 based on the STA and the delay.

At 1107, the system 100 determines whether the vehicle is detected at the next waypoint (e.g., W7) within a predetermined time of the ETA for W7, such as plus or minus 2 minutes. If the vehicle is detected within the predetermined time of the ETA for W7 at W7, then delay is recalculated for W7 and the ETA for the destination C is updated at 1108. If the vehicle is not detected within the predetermined time of the ETA for W7 at W7, a trigger or flag is generated indicating that the vehicle may have changed routes at 1109. At 1110, the vehicle is detected at a new waypoint, which may be on a different route, and the ETA to the destination is recalculated. Once the trigger is generated at 1109, the system 100 may start to actively identify the location of the vehicle to determine whether it changed its route or to determine whether its destination changed. This may include querying location detection sensors or other systems or the driver to determine if a route or destination change has occurred.

The method 1100 may be performed by the system 100 such as shown in FIG. 2 or may be performed by the application 206 shown in FIG. 3 to perform locally-based ETA calculations.

While the embodiments have been described with reference to examples, those skilled in the art will be able to make various modifications to the described embodiments without departing from the scope of the claimed embodiments. Furthermore, the systems, methods and functions described herein may be used for tracking and determining ETAs and adapting STAs for any type of vehicle. Buses and taxis are described by way of example, but the systems and methods may be used for private fleets of vehicles, such as trucking companies, trains, boats, bicycles, or any private or public vehicle that may be used for transportation.

What is claimed is:

1. A transportation system to determine estimated time of arrival (ETA), the system comprising:
a data storage to store a standard time of arrival (STA) table, wherein the STA table includes an STA for a fixed stop along a fixed route and an STA for each waypoint or geo-section along the fixed route, wherein each waypoint represents a point along the fixed route and each geo-section represents a portion of a geographic area related to the fixed route; and
at least one hardware processor to:
determine, for a vehicle traveling on the fixed route and travelling towards the fixed stop from an origin, an actual time of arrival (ATA) of the vehicle at the waypoints or geo-sections along the fixed route between the origin and the fixed stop, wherein the ATA of the vehicle is determined based on a current location of the vehicle, and wherein the current location of the vehicle is determined by using a location sensor, wherein the location sensor is to further detect when the vehicle is adjacent to one of the waypoints, and transmit the ATA associated with the detection of when the vehicle is adjacent to the one of the waypoints;
determine a delay at each of the waypoints or geo-sections, wherein the delay for each waypoint or geo-section is determined as a difference between the STA from the STA table for the waypoint or geo-section and the ATA of the vehicle at the waypoint or the geo-section;
determine an ETA of the vehicle at the fixed stop, wherein the ETA is determined as a sum of the delay at each waypoint or geo-section added to the STA of the fixed stop;
determine an ETA for each fixed stop of a plurality of fixed stops of the fixed route based on ATAs for previous fixed stops and intervening waypoints or geo-sections; and
transmit the ETA for each fixed stop of the plurality of fixed stops of the fixed route to display a map including the fixed route and the ETA for each fixed stop of the plurality of fixed stops of the fixed route.

2. The system of claim 1, wherein the at least one hardware processor is to:
determine whether for a period of M number of days, if delays for at least one of the waypoints or geo-sections or the fixed stop are greater than a threshold for N consecutive days within the M number of days, wherein M and N are greater than 1,
in response to the delays for the at least one waypoint or geo-section or the fixed stop being greater than the threshold for N consecutive days within the M number of days, determine a new STA for the at least one waypoint or geo-section or the fixed stop based on the delays, and
store the new STA for the at least one waypoint or geo-section or the fixed stop in the STA table.

3. The system of claim 2, wherein the new STA for the at least one waypoint or geo-section or the fixed stop is based on an old STA for the at least one waypoint or geo-section or the fixed stop and at least one delay determined for the at least one waypoint or geo-section or the fixed stop.

4. The system of claim 2, wherein the at least one hardware processor is to calculate the threshold by multiplying a standard deviation of the delay with a user-defined value, n, wherein n is greater than 0.

5. The system of claim 2, wherein the at least one hardware processor is to calculate N, wherein N is a mean of consecutive days the delays exceeded the threshold within the M days.

6. The system of claim 1, wherein the geographic area including the fixed route is divided into the geo-sections, each having a length equal to one another.

7. The system of claim 1, wherein the at least one hardware processor is to:
determine whether the delay associated with the ETA of the vehicle at the fixed stop is negative; and
in response to a determination that the delay associated with the ETA of the vehicle at the fixed stop is negative, set the ETA of the vehicle at the fixed stop to the STA of the fixed stop.

8. The system of claim 1, wherein the at least one hardware processor is to:
determine whether for a period of M number of days, if delays for at least one of the waypoints or geo-sections or the fixed stop is greater than a threshold for N consecutive days within the M number of days, wherein M and N are greater than 1,
in response to the delays for the at least one waypoint or geo-section or the fixed stop being greater than the threshold for N consecutive days within the M number of days, determine a new STA for the at least one waypoint or geo-section or the fixed stop based on an average of the delays, and
store the new STA for the at least one waypoint or geo-section or the fixed stop in the STA table.

9. The system of claim 1, wherein a geo-section along the fixed route is divided into horizontal and vertical sections specified by distances to form a grid.

10. A method to estimate ETAs for stops on a vehicle's route, the method comprising:
determining an origin and a destination for the vehicle travelling from the origin to the destination on the route, wherein the route includes a plurality of fixed stops and waypoints between the fixed stops, wherein each of the waypoints represents a point along the route;
downloading, via a computer network, locations of the plurality of fixed stops and the waypoints between the fixed stops from a remote system and standard time of arrivals (STAs) for the plurality of fixed stops and the waypoints between the fixed stops;
determining a current location of the vehicle on the route by using a location sensor, wherein the location sensor is to further transmit a signal associated with the current location of the vehicle;
determining, from the locations and the current location, a closest waypoint and a closest fixed stop on the route to the current location of the vehicle;
determining an estimated time of arrival (ETA) to the closest waypoint and the closest fixed stop based on a distance from the current location to the closest waypoint and the closest fixed stop;
determining a delay for the closest waypoint and the closest fixed stop from the ETA and an STA of the closest waypoint and the closest fixed stop;

determining, by a hardware processor, an ETA to the destination based on the delay and an STA for the destination; and transmitting the ETA to the destination to display a map including the route and the ETA to the destination.

11. The method of claim 10, wherein determining the closest fixed stop comprises:

querying a distance application program interface or a direction application program interface to determine the closest fixed stop to the current location.

12. The method of claim 10, wherein the closest fixed stop is a next fixed stop on the route to be traversed by the vehicle travelling from the current location.

13. The method of claim 10, wherein determining the ETA to the closest waypoint and the closest fixed stop comprises:

identifying a predetermined average speed for a segment of the route between the current location and the closest waypoint and the closest fixed stop; and determining the ETA to the closest waypoint and the closest fixed stop from the average speed and the distance between the current location and the closest waypoint and the closest fixed stop along a direction of movement.

14. The method of claim 10, wherein the ETA for the destination is updated according to a delay determined for each waypoint and each fixed stop between the closest waypoint, the closest fixed stop and the destination on the route.

15. A non-transitory computer readable medium including machine readable instructions executed by at least one hardware processor to:

determine a destination of a vehicle traveling on a non-fixed route to the destination, wherein the non-fixed route represents a route traversed by the vehicle between a plurality of routes that are also available for traversal by the vehicle;

identify a plurality of stored routes between a current location of the vehicle determined by using a location sensor and the destination, wherein each route of the stored routes includes a plurality of waypoints, wherein the waypoints represent points along the associated route, and wherein the location sensor is to further transmit a signal associated with the current location of the vehicle;

determine, from waypoints traversed by the vehicle, a current route of the stored routes on which the vehicle is travelling;

determine a closest waypoint to the current location on the current route;

determine a delay for the closest waypoint;

estimate an estimated time of arrival (ETA) for the destination based on the delay and a standard time of arrival (STA) for the destination for the current route;

determine whether the vehicle remains on the current route or changes from the current route to another route of the stored routes based on whether the vehicle traverses a next waypoint for the current route or the another route;

in response to a determination that the vehicle remains on the current route, continue to estimate the ETA for the destination based on a delay determined for each subsequent way point traversed on the current route, and transmit the ETA for the destination to display a map including the current route and the ETA for the destination; and in response to a determination that the vehicle changes from the current route to the another route of the stored routes, determine the closest waypoint to the current location on the another route, determine the delay for the closest waypoint, and estimate the ETA for the destination based on the delay and the STA for the destination for the another route as the current route, and transmit the ETA for the destination to display a map including the another route and the ETA for the destination.

16. The non-transitory computer readable medium of claim 15, wherein to determine whether the vehicle remains on the current route comprises instructions to:

determine an ETA for the next waypoint on the current route; and determine whether the vehicle traverses the next waypoint within a predetermined time of the ETA.

17. The non-transitory computer readable medium of claim 16, wherein if the vehicle traverses the next waypoint within the predetermined time of the ETA, determining the vehicle remains on the current route; and if the vehicle does not traverse the next waypoint within the predetermined time of the ETA, setting a trigger indicating the vehicle has potentially changed routes to the destination.

18. The non-transitory computer readable medium of claim 17, wherein in response to the trigger being set, the instructions are to:

identify a next waypoint traversed by the vehicle towards the destination; and determine the another route from the stored routes based on the identified next waypoint.

19. The non-transitory computer readable medium of claim 15, wherein the delay for the closest waypoint is determined from an ETA for the closest waypoint and a predetermined STA of the closest waypoint.

20. The non-transitory computer readable medium of claim 19, wherein determining the delay for the closest waypoint comprises instructions to:

determine whether for a period of M number of days, if delays for the closest waypoint are greater than a threshold for N consecutive days within the M number of days, wherein M and N are greater than 1, in response to the delays for the closest waypoint being greater than the threshold for N consecutive days within the M number of days, determine a new STA for the closest waypoint based on the delays, and store the new STA for the closest waypoint in a STA table.

* * * * *

UNITED STATES PATENT AND TRADEMARK OFFICE
CERTIFICATE OF CORRECTION

PATENT NO.       : 9,530,314 B2
APPLICATION NO.  : 14/032861
DATED            : December 27, 2016
INVENTOR(S)      : Anutosh Maitra et al.

Page 1 of 1

It is certified that error appears in the above-identified patent and that said Letters Patent is hereby corrected as shown below:

On the Title Page

At Item (71), Applicants "Anutosh Maitra, Bangalore (IN); Sanjoy Paul, Bangalore (IN); Saurabh Bhadkaria, Bangalore (IN); and Chiranjeeb Ghosh, West Bengal (IN)" should be "ACCENTURE GLOBAL SERVICES LIMITED, Dublin (IE)".

Signed and Sealed this
Eighteenth Day of April, 2017

Michelle K. Lee
*Director of the United States Patent and Trademark Office*